United States Patent
Arimilli et al.

[11] Patent Number: 5,924,121
[45] Date of Patent: Jul. 13, 1999

[54] ADAPTIVE WRITEBACK OF CACHE LINE DATA IN A COMPUTER OPERATED WITH BURST MODE TRANSFER CYCLES

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 08/771,995

[22] Filed: Dec. 23, 1996

Related U.S. Application Data

[51] Int. Cl.$^6$ .................................................. G06F 12/00
[52] U.S. Cl. ................................... 711/143; 711/118
[58] Field of Search ................................... 711/118, 141, 711/143, 154

[56] References Cited

U.S. PATENT DOCUMENTS

| | | |
|---|---|---|
| 5,016,168 | 5/1991 | Liu . |
| 5,155,824 | 10/1992 | Edenfield ............................. 711/143 |
| 5,228,134 | 7/1993 | MacWilliams et al. . |
| 5,293,603 | 3/1994 | MacWilliams et al. . |
| 5,353,410 | 10/1994 | Macon, Jr. et al. . |
| 5,467,460 | 11/1995 | Patel .................................... 711/143 |
| 5,546,579 | 8/1996 | Josten et al. . |
| 5,555,391 | 9/1996 | De Subijana et al. . |
| 5,561,780 | 10/1996 | Glew et al. . |
| 5,666,514 | 9/1997 | Cheriton ................................. 711/144 |
| 5,737,751 | 4/1998 | Patel ....................................... 711/133 |
| 5,802,572 | 9/1998 | Patel ....................................... 711/143 |

Primary Examiner—Tod R. Swann
Assistant Examiner—Christopher S. Chow
Attorney, Agent, or Firm—Casimer K. Salys

[57] ABSTRACT

System and method for selectively adapting the burst mode writeback from cache to main memory consistent with the extent of a cache line actually modified by the processor and at the granularity of the bus connecting the cache to main memory. A cache controller speculatively reads a cache line with each address issued by this processor. When the address is related to a read cycle of the processor, the data is forwarded to the processor. When the address is related to a write cycle of the processor, the data read from the cache is compared to the write data from the processor to detect changes at a granularity consist with the size of the system data bus. The cache line stored in the cache upon such writing is marked at the granularity of the system data bus with tag bits to indicate which portions have been modified. Upon deallocation, the tag bits stored in the cache directory identify those portions of the cache lines requiring transmission back to main memory as an aspect of the burst writeback operation.

16 Claims, 5 Drawing Sheets

ADAPTIVE WRITEBACK OF CACHE LINE DATA IN A COMPUTER OPERATED WITH BURST MODE TRANSFER CYCLES

FIELD OF THE INVENTION

The present invention relates in general to computer architectures. More particularly, the invention is directed to systems and methods for writing data back from a cache to system memory when data transfers are accomplished in a burst mode.

BACKGROUND OF THE INVENTION

Contemporary computer systems often implement hierarchical caching structures in which multiple levels of data cache are utilized to maximize the data processing performance of the complete system. Similarly, contemporary computers routinely use multiple processors, each having multiple levels of data cache, connected through a system bus to a main memory as well as various input/output devices or buses. In the context of such systems, the cache read and write operations are commonly performed through burst mode data transfer cycles. Burst mode transfers are used because they maximize the utilization of the bus bandwidth, in recognition of the fact that bus contention, especially in multiprocessor systems, is proving to be a major constraint on the throughput of the complete system.

The number of data transfer cycles in a burst, often referred to as beats, is equal to the cache line size divided by the width of the data bus. The units of measure are routinely, but not necessarily, bytes, identified within the drawings by the designator "B". The writing of modified data from cache back to main memory is normally accomplished in a burst mode encompassing the full cache line, as implemented through cache controller. This convention of transferring the full cache line occurs even if only one byte of the data in the cache line was actually altered as an aspect of processor activity prior to the writeback cycle. The initiation of the writeback cycle is attributable to a number of causes, examples including normal cache deallocation (cast out), a cross deallocation due to a snoop hit (multiprocessor systems), or due to a deliberate cache management instruction being executed by the processor.

The conventional practice of writing back the full cache line, even if done in a burst mode, consumes multiple clock cycles, at least equal in number to the beats of the burst to transfer the complete cache line. Yet, in multiprocessor and faster uniprocessor systems bus contention is becoming a major limitation on computer system performance. Thus, what is needed is a system and method by which cache writeback can be accomplished in a burst mode adaptable at the granularity of the data bus to transfer only modified data from the cache to main memory.

SUMMARY OF THE INVENTION

The present invention provides a system and method for selective writeback of cache data through the use of a cache controller managing a cache operating between a processor and a main memory, comprising a processor operable to read data from the cache, process the data, write the process data back to the cache, and generate addresses, means for reading a line of data, comprised of multiple bytes, from the cache responsive to a first address from the processor, means for transferring the line of read data to the processor upon determination that the first address relates to a cache read cycle of the processor, means for storing the line of read data in a memory upon determination that the first address relates to a cache write cycle of the processor, means for comparing the stored line of read data with the line of write cycle data written by the processor to detect modified bytes, means for marking modified bytes detected by the comparison, and means for selectively writing back from the cache to the main memory data bytes related to the first address and marked as modified. In another form, the invention relates to a process implemented by the controller so defined.

In a particularized practice of the invention, a speculative cache line read is performed whenever the processor issues an address on the processor bus. If the processor operation associated with the address is a read operation, the data read from the cache is transferred over the processor bus to the processor. On the other hand, if the processor operation is a write, the data read from the cache is stored in a register proximate the cache, and then compared with the data being written from the processor to the cache, at the granularity of the system data bus, to determine which parts of the cache line were actually altered by the processor. The parts that were altered are identified by tags in the cache directory as an aspect of the writing of the data from the processor to the cache. Upon deallocation of the cache line, the directory bits are interrogated and only those bytes associated with changed data are transmitted, at the granularity of the system data bus, in the ensuing burst transfer over the system data bus back to main memory. Thereby, system data bus use is minimized to accomplish the writeback operation.

These and other features of the invention will be more clearly understood and appreciated upon considering the detailed embodiments described hereinafter.

DESCRIPTION OF THE PREFERRED EMBODIMENT

Figure 1:
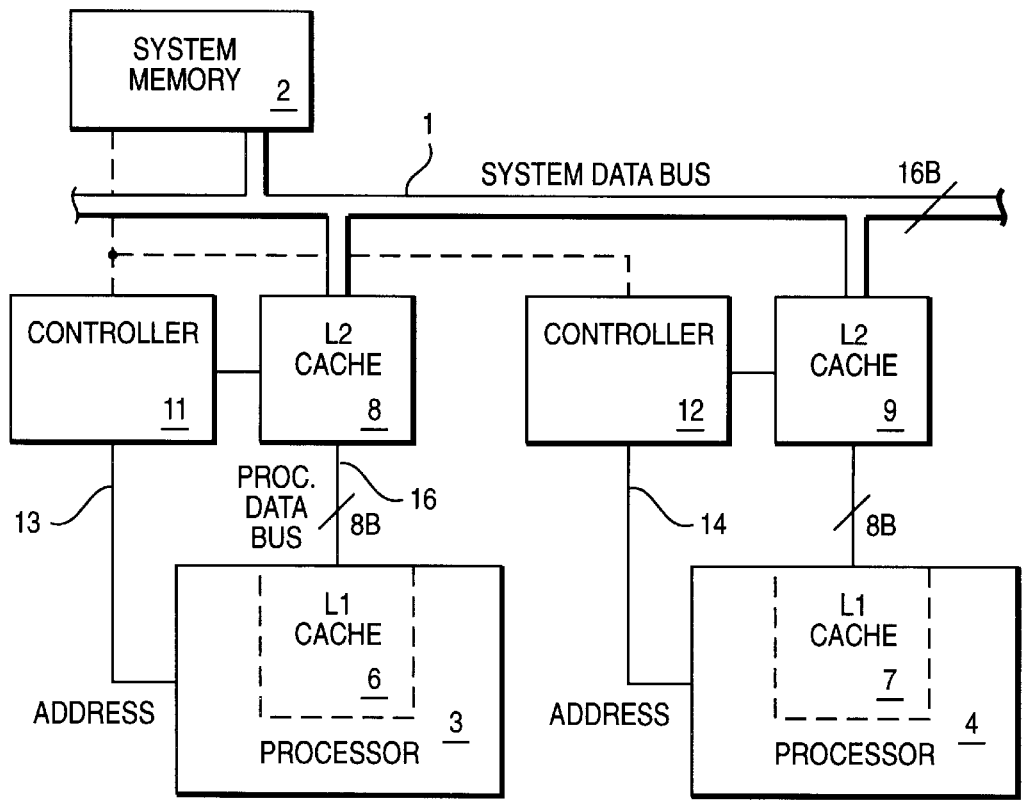
FIG. 1 is a schematic block diagram of a multiprocessor system with a hierarchical data cache structure.

FIG. 1 schematically depicts by functional block diagram a computer system within the context of which the invention is preferably practiced. As shown, system data bus 1 interconnects system memory 2 with processors 3 and 4. Processors 3 and 4 incorporate onto their respective integrated circuit chips L1 level caches 6 and 7. L2 caches 8 and 9 can be integrated, but will more likely be on physically separate chips. Each processor and cache have associated therewith a respective cache controller, identified by reference numerals 11 and 12. Cache controllers 11 and 12 coordinate the transfer of data to and from processors 3 and 4 responsive to addresses on respective lines 13 and 14. Cache controllers 11 and 12 also coordinate data transfers between system memory 2 and L2 caches 8 and 9. Data transfers between system memory 2 and processors 3 and 4 are accomplished over 16 byte wide system data bus 1 and 8 byte wide processor data buses 16 and 17.

Figure 2:
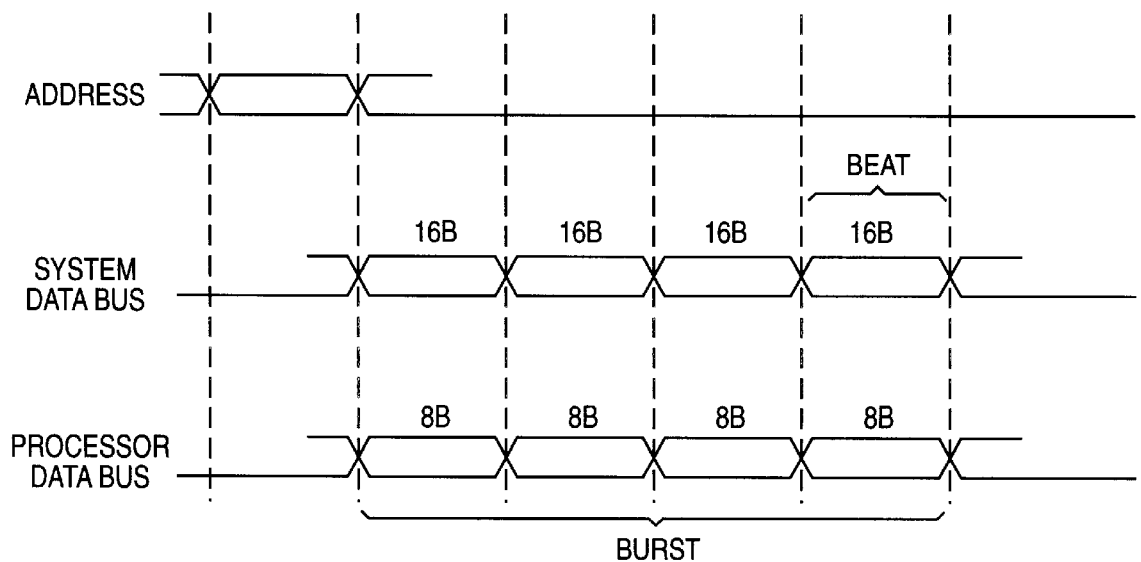
FIG. 2 is a schematic of waveforms characterizing a burst mode of data transfer.

In keeping with the preferred practice of the prior art, data transfers, both read and write, between processors 3 and 4 and respective L2 caches 8 and 9 are preferably accomplished using a burst mode of multiple data transfer cycles related to a single cache line address. A representative example is depicted by waveforms in FIG. 2, where a 64 byte long cache line is transferred over system data bus 1 in a succession of 4 beats, making up a single burst, with each beat providing a 16 byte wide data transfer. The granularity of the beat, namely the 16 byte size, is defined by the size of the system data bus, while the number of beats in a burst at the system data bus level is derived by dividing the cache line length by the size of the system data bus.

Transfers between L2 caches 8 and 9, and corresponding processors 3 and 4, are accomplished in 8 byte wide segments, representing the granularity of the corresponding processor data buses 16 and 17 in keeping with the 32 byte size cache line lengths in L1 level caches 6 and 7.

As noted earlier, the objective of the invention is to minimize the use of system data bus 1 when cache lines are subject to a writeback from either L2 cache 8 or L2 cache 9 to system memory 2. In the context of the waveforms in FIG. 2, it is clearly undesirable to have a writeback operation monopolize system data bus for a full four beats of a burst cycle when a processor only modified part of one of the 16 byte parts of a cache line. Namely, system data bus utilization would be improved if, in the case of the aforementioned situation, only the appropriate single 16 byte beat were sent from the L2 cache to the system memory upon a writeback cycle. In the worse case of such architecture, the controller would initiate all four beats upon a writeback cycle, while in the best case, where the processor wrote but never modified any data in a cache line, no data transfer would have to be accomplished over the system data bus.

Figure 3:
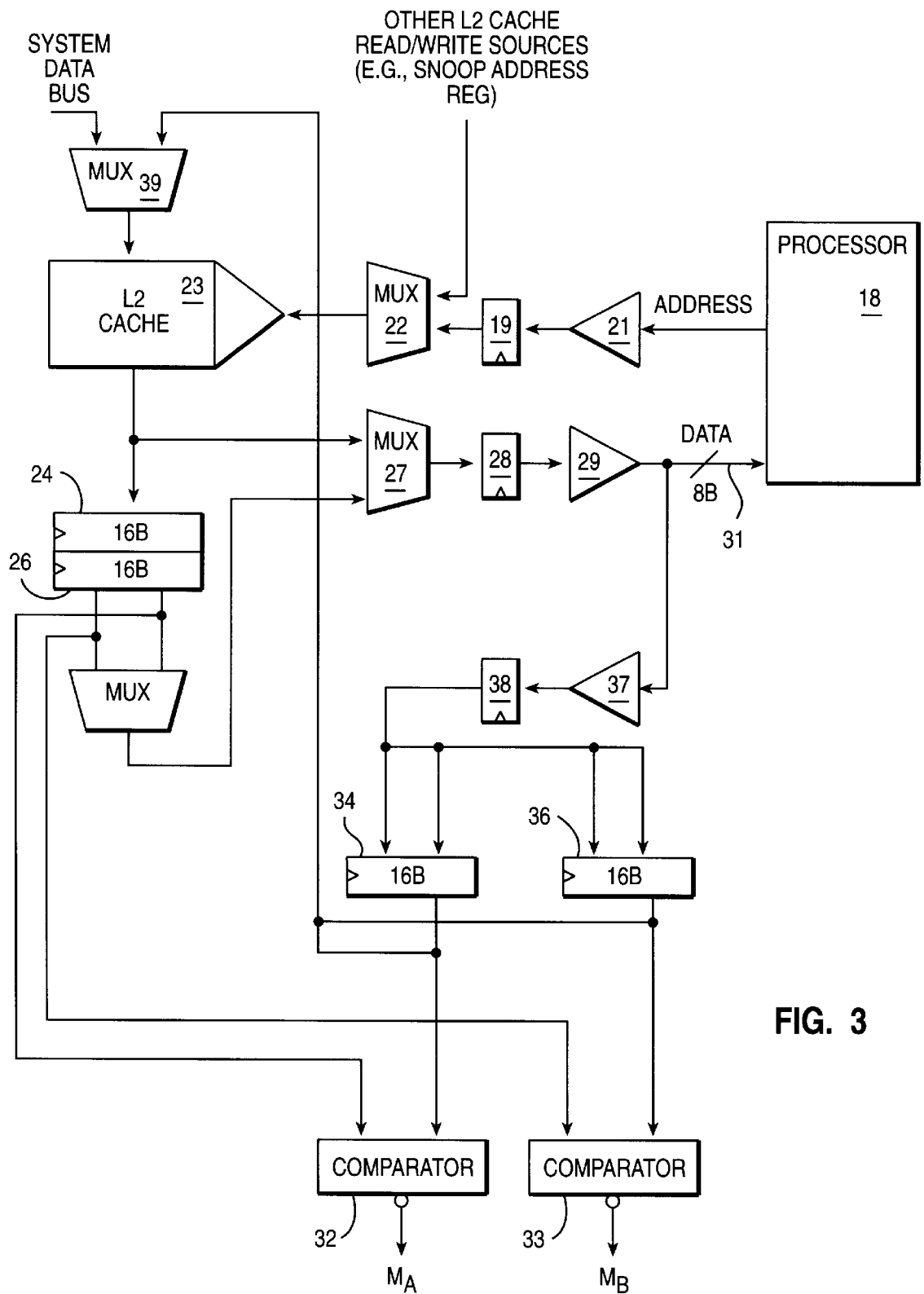
FIG. 3 is a schematic depicting the data storage and comparison functions of the present invention.
Figure 4:
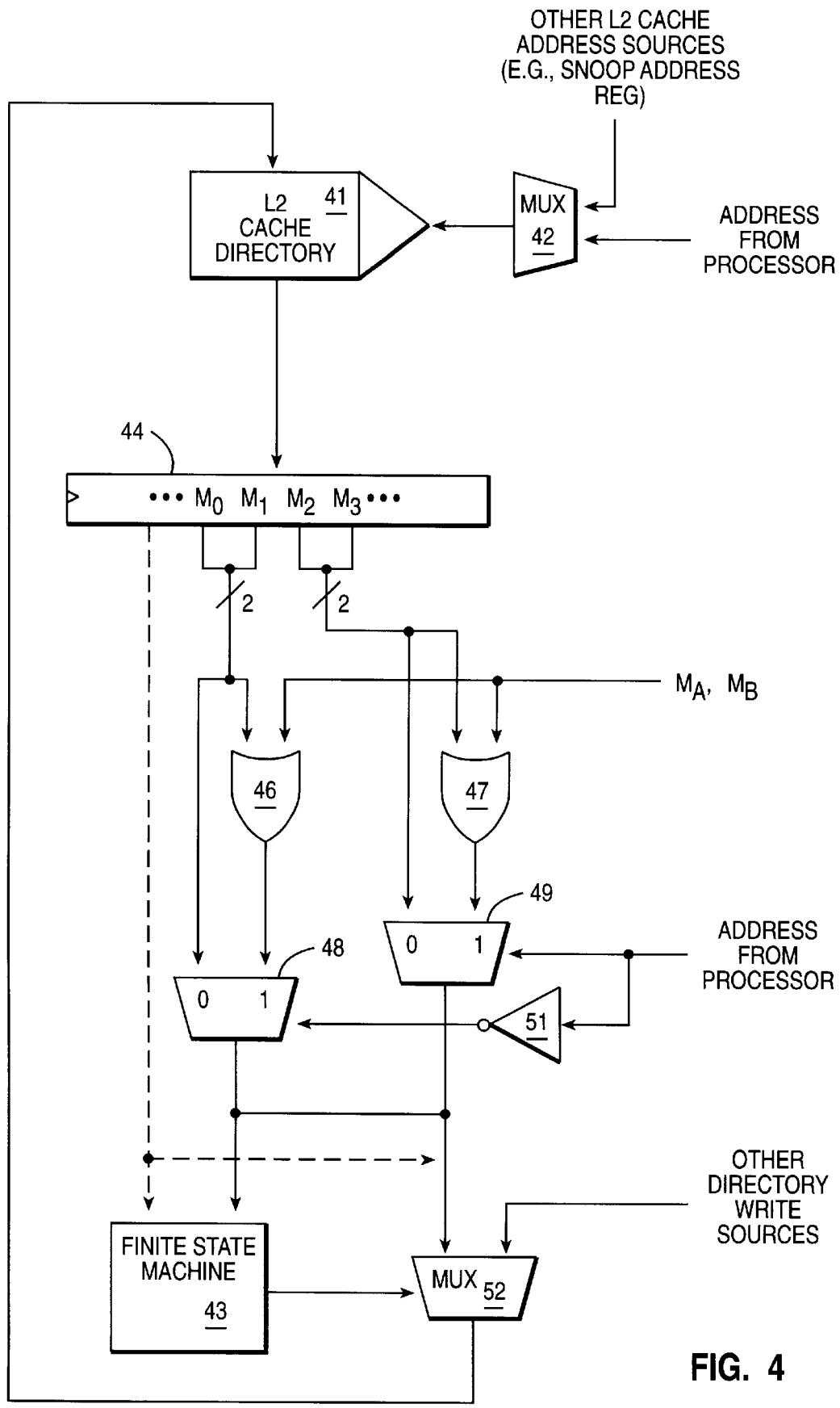
FIG. 4 is a schematic depicting the tag bit generation functions of the present invention.
Figure 6:
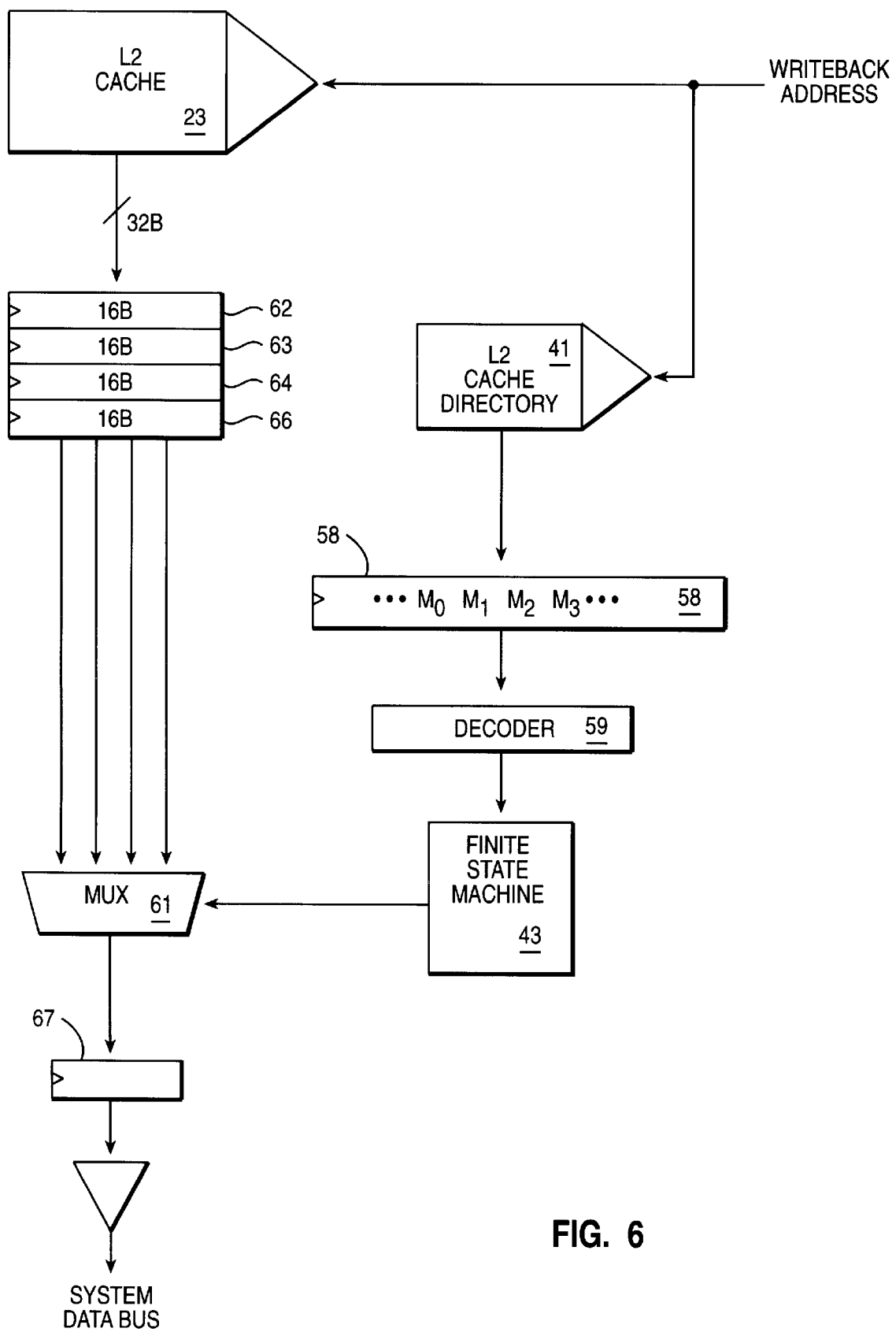
FIG. 6 is a schematic depicting the selective writeback functions of the invention.

The controller architecture needed to implement these features is schematically depicted by functional elements in FIGS. 3, 4 and 6. As embodied in FIG. 3, elements of the cache controller of the present invention receive addresses from processor 18 and stores those addresses in register 19 after amplification by element 21. Once selected by multiplexer 22 to access L2 cache 23, the address identifies two 16 byte sections of a 32 byte processor cache line. The sections are stored in registers 24 and 26. When the address issued by processor 18 is found to involve a read, in contrast to a write cycle, multiplexer 27 transmits the data into latch 28, and in succession to processor 18 as amplified by element 29 over 8 byte wide data bus 31.

The cache data speculatively read from L2 cache 23 with each address issued by processor 18, as stored in registers 24 and 26, is also compared in comparators 32 and 33 with the data in registers 34 and 36. The data in registers 34 and 36 is data output on line 31 from processor 18 in a write operation, following amplification in element 37 and storage in register 38. The processor write data in registers 34 and 36 is also transmitted to L2 cache 23 through multiplexer 39. Note that comparators 32 and 33 examine the data for changes in a cache line at the granularity of the system bus, namely, 16 bytes.

The outputs of comparators 32 and 33 are tag bits $M_A$ and $M_B$ which correspondingly indicate whether a 16 byte granularity piece of a cache line written by the processor has been modified. Thereby, 16 byte segments of each cache line are individually marked to determine whether during a subsequent writeback operation to main memory that such segments of the cache line do or do not need to be written back to main memory.

FIG. 4 schematically depicts by functional elements the directory update logic by which the tag bits associated with modified segments of the cache line, at the granularity of the system data bus 1 (FIG. 1), are written into directory 41 of the L2 cache. Addresses from processor 18 are selected by multiplexer 42. Finite state machine 43 follows a sequence which conforms to the logic of the operations described. The bits read from L2 cache directory 41 are stored in register 44 and compared in pairs in OR gates 46 and 47 with the output bits from comparators 32 and 33 (FIG. 3). The outputs are selected by multiplexers 48 and 49 responsive to the address from the processor 18 (FIG. 3) using the address and its complement, the complement generated by inverting amplifier 51. The outputs of multiplexers 48 and 49 are provided both to finite state machine 43 and multiplexer 52, multiplexer 52 being selectively enabled by finite state machine 43 to write the data back into L2 cache directory 41. Multiplexer 52 selects between tag bits or other sources used to write L2 cache directory 41 (e.g., a binary 0 . . . 0 to reset all the bits following an L2 cache writeback to main memory.

Figure 5:
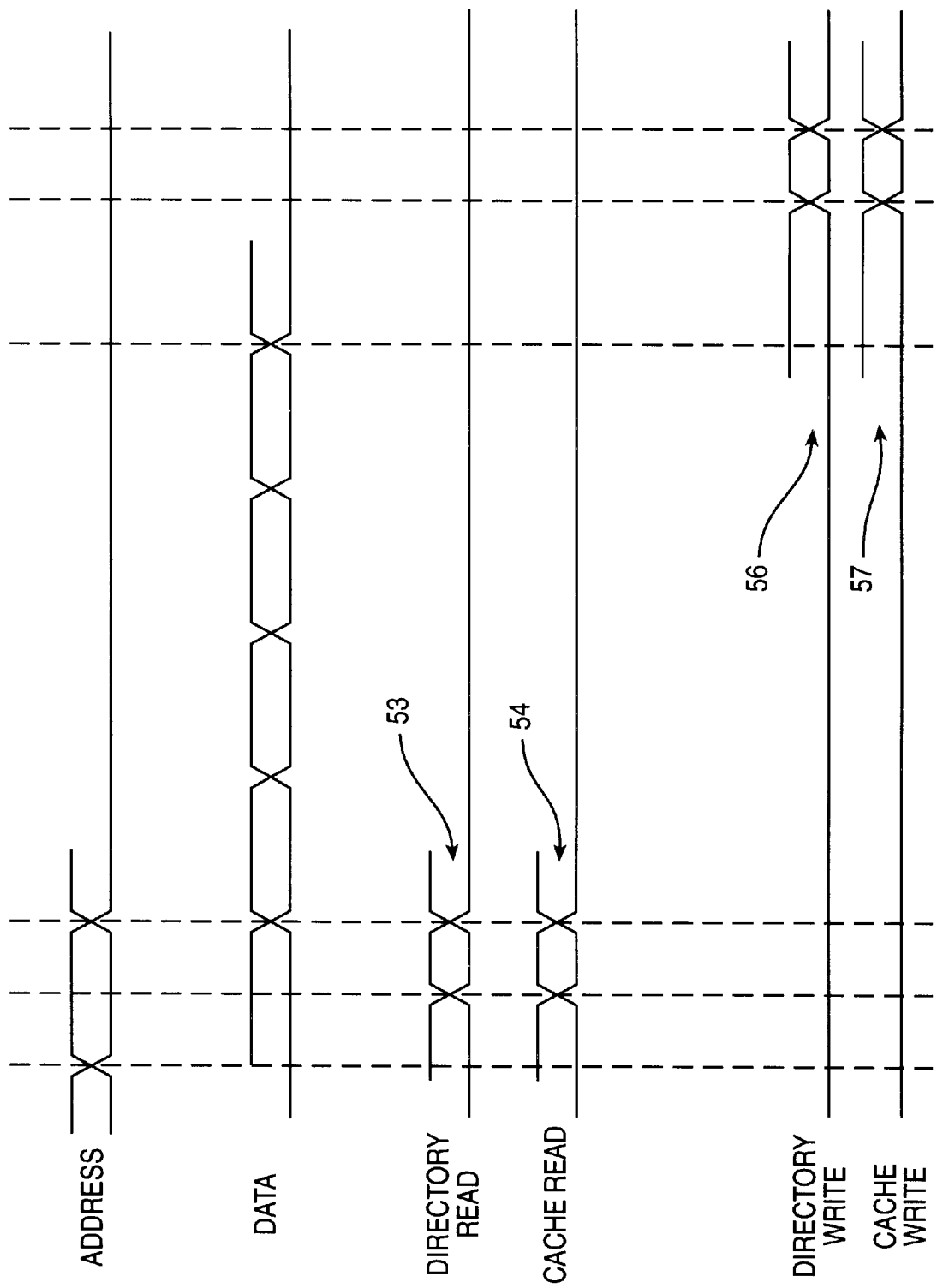
FIG. 5 is a schematic depicting waveforms illustrating operation of the present invention.

FIG. 5 schematically depicts waveforms and their related timing characteristic as implemented according to the invention. As shown at 53 and 54, a cache directory read and cache read are accomplished responsive to the generation of an address by the processor. Likewise, a cache directory write and a cache write at 56 and 57 are accomplished following any burst transfer between the L2 cache and the processor.

FIG. 6 schematically depicts the functional elements which accomplish an adaptive writeback of cache data from the L2 cache to main memory over the system data bus. The writeback is adaptive in that the size and content of the burst mode varies depending upon the segments of the cache line being written back as a consequence of being modified by the processor in an earlier processor write operation. The number of beats in the burst correspond to the number of segments of the cache line requiring writeback as indicated by tag bits. The granularity of each segment is of course consistent with the size of the system data bus, in this case being 16 bytes in width.

The writeback address sent to L2 cache 23 and L2 cache directory 41 is generated by processor 18 (FIG. 3). The address as applied to L2 cache directory 41 causes a readout of corresponding tag bits, which tag bits are stored in register 58, decoded in decoder 59, and transmitted to finite state machine 43 for use in selecting through multiplexer 61. The writeback address as applied to L2 cache 23 provides a readout of 16 byte granularity segments of the cache line into successive registers 62, 63, 64 and 66. The selected 16 byte granularity segment of the cache line from among the registers by multiplexer 61 is stored in register 67 and eventually provided to the system data bus 1 (FIG. 1). The decode of the tag bits performed in decoder 59 is defined by Table A as to the number of segments modified and the number of data cycles, beats, needed to complete the writeback sequence to main memory.

It will be understood by those skilled in the art that the embodiment set forth hereinbefore are merely exemplary of the numerous arrangements by which the invention may be practiced, and as such may be replaced by equivalents without departing from the invention which will now be defined by appended claims.

TABLE A

DECODE OF "MODIFIED 16B GRANULE" BITS FROM L2 DIRECTORY

| $M_x$ | No. Granules Modified | System Data Bus Write, #Data Cycles | Comments |
|---|---|---|---|
| 0000 | 0 | 0 | No Sys Bus Write |
| 0001 | 1 | 1 | Add(26:27)=b'11' |
| 0010 | 1 | 1 | Add(26:27)=b'10' |
| 0011 | 2 | 2 | Add(26:27)=b'10' |
| 0100 | 1 | 1 | Add(26:27)=b'01' |
| 0101 | 2 | 4 | Add(26:27)=b'00' (Non-Contiguous) |
| 0110 | 2 | 2 | Add(26:27)=b'01' |
| 0111 | 3 | 3 | Add(26:27)=b'01' |
| 1000 | 1 | 1 | Add(26:27)=b'00' |
| 1001 | 2 | 2 | Add(26:27)=b'11' (Wraps on the 64B Boundary) |
| 1010 | 2 | 4 | Add(26:27)=b'00' (Non-Contiguous) |
| 1011 | 3 | 3 | Add(26:27)=b'10' (Wraps on the 64B Boundary) |
| 1100 | 2 | 2 | Add(26:27)=b'00' |
| 1101 | 3 | 3 | Add(26:27)=b'11' Wraps on the 64B Boundary) |
| 1110 | 3 | 3 | Add(26:27)=b'00' |
| 1111 | 4 | 4 | Add(26:27)=b'00' |

I claim:

1. A cache controller managing a cache operating between a processor and a main memory, comprising:

a processor operable to read data from the cache, process the data, write the processed data back to the cache, and generate addresses;

means for reading a line of data, comprised of multiple bytes, from the cache responsive to a first address from the processor;

means for transferring the line of read data to the processor upon determination that the first address relates to a cache read cycle of the processor;

means for storing the line of read data in a memory upon determination that the first address relates to a cache write cycle of the processor;

means for comparing the stored line of read data with a line of write cycle data written by the processor to detect modified bytes;

means for marking modified bytes detected by the means for comparing; and means for selectively writing back from the cache to the main memory data bytes related to the first address and marked as modified.

2. The apparatus recited in claim 1, wherein the reading and writing of data by the processor is accomplished in a burst mode of operation.

3. The apparatus recited in claim 1, wherein the means for comparing operates on a granularity matching a system bus connecting the processor to the main memory.

4. The apparatus recited in claim 2, wherein the means for comparing operates on a granularity matching a system bus connecting the processor to the main memory.

5. The apparatus recited in claim 3, wherein the means for marking uses tag bits stored in a directory of the cache.

6. The apparatus recited in claim 4, wherein the means for marking uses tag bits stored in a directory of the cache.

7. The apparatus recited in claim 5, wherein the means for storing the line is a register on an integrated circuit chip common to the cache.

8. The apparatus recited in claim 6, wherein the means for storing the line is a register on an integrated circuit chip common to the cache.

9. A method of controlling a cache operating between a processor and a main memory, comprising the steps of:

operating a processor to read data from a cache, process the data, write the processed data back to the cache, and generate addresses;

reading a line of data, comprised of multiple bytes, from the cache responsive to a first address from the processor;

transferring the line of read data to the processor upon determination that the first address relates to a cache read cycle of the processor;

storing the line of read data in a memory upon determination that the first address relates to a cache write cycle of the processor;

comparing the stored line of read data with a line of write cycle data written by the processor to detect modified bytes;

marking modified bytes detected by the comparison; and selectively writing back from the cache to the main memory data bytes related to the first address and marked as modified.

10. The method recited in claim 9, wherein the operating of the processor in the reading and writing of data by the processor is accomplished in a burst mode.

11. The method recited in claim 9, wherein the step of comparing operates on a granularity matching a system bus connecting the processor to the main memory.

12. The method recited in claim 10, wherein the step of comparing operates on a granularity matching a system bus connecting the processor to the main memory.

13. The method recited in claim 11, wherein the step of marking uses tag bits stored in a directory of the cache.

14. The method recited in claim 12, wherein the step of marking uses tag bits stored in a directory of the cache.

15. The method recited in claim 13, wherein the step of storing the line is accomplished with a register on an integrated circuit chip common to the cache.

16. The method recited in claim 14, wherein the step of storing the line is accomplished with a register on an integrated circuit chip common to the cache.

* * * * *